United States Patent
Tsutsumi et al.

(10) Patent No.: US 6,725,642 B2
(45) Date of Patent: Apr. 27, 2004

(54) PROTECTIVE GUIDE FOR FLEXIBLE ELONGATED ARTICLE

(75) Inventors: Kazuhiro Tsutsumi, Osaka (JP); Shoichiro Komiya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 10/395,578

(22) Filed: Mar. 24, 2003

(65) Prior Publication Data
US 2003/0182924 A1 Oct. 2, 2003

(30) Foreign Application Priority Data
Apr. 2, 2002 (JP) .......................... 2002-100403

(51) Int. Cl.⁷ ............................. F16G 13/16; F16L 11/00
(52) U.S. Cl. ............................. 59/78.1; 59/900; 248/49
(58) Field of Search .................... 59/78.1, 900; 248/49, 248/51

(56) References Cited

U.S. PATENT DOCUMENTS 4,570,437 A    2/1986  Moritz
5,201,885 A  * 4/1993  Wehler et al. ............... 59/78.1
5,638,672 A  * 6/1997  Furukawa .................... 59/78.1
6,510,682 B2 * 1/2003  Komiya et al. ............... 59/78.1

FOREIGN PATENT DOCUMENTS

JP    10-28310    1/1998

* cited by examiner

Primary Examiner—David Jones
(74) Attorney, Agent, or Firm—Howson & Howson

(57) ABSTRACT

A protective guide for a cable is formed by connecting a plurality of links, each of which is formed a pair of spaced, opposite, side plates connected to each other by connecting plates. Each side plate includes a connecting rod having a flexible portion and an engagement portion, and includes an opposite connecting opening into which a connecting rod of the adjacent side plate is fitted. The connecting rods include flexible portions which bend to allow adjacent links to articulate relative to each other. The guide avoids generation of dust due to frictional rubbing of parts against one an other, reduces noise generated during high speed movement, and allows easily removal and addition of links.

4 Claims, 9 Drawing Sheets

Fig.2(A)  fig.2(B)
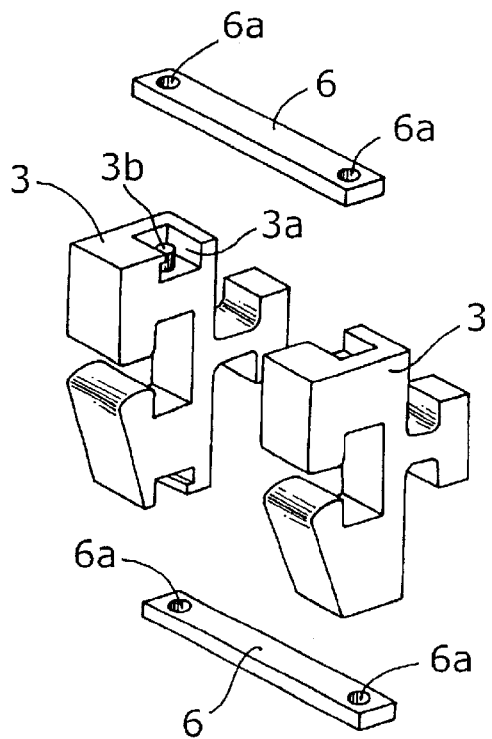
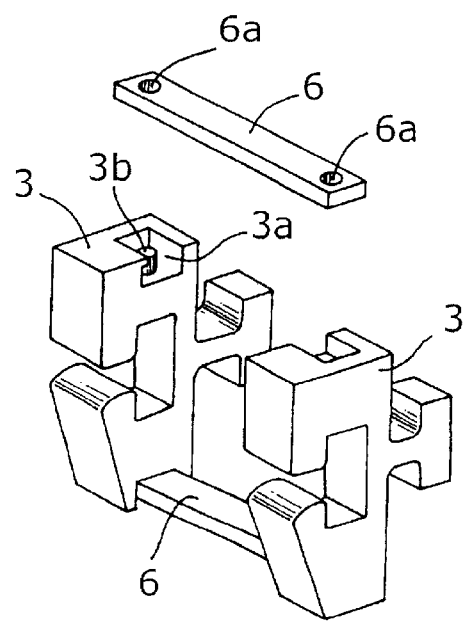
Fig.2(C)
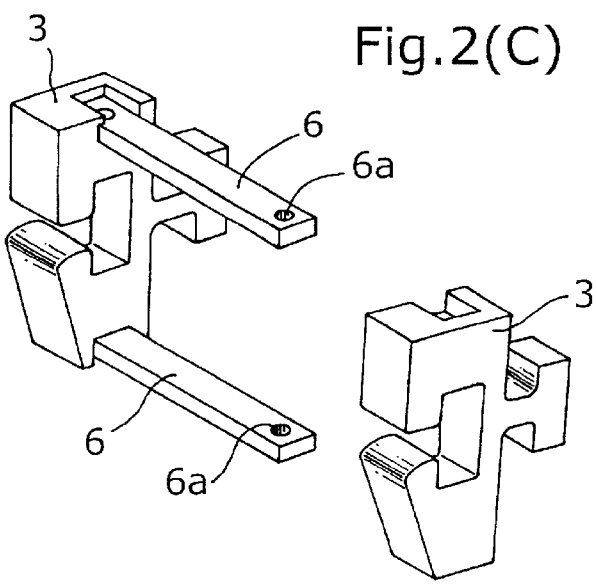

PROTECTIVE GUIDE FOR FLEXIBLE ELONGATED ARTICLE

FIELD OF THE INVENTION

This invention relates to a protective guide for a flexible, elongated article such as a wire cable, a hydraulic hose, a pneumatic hose, or the like. The flexible, elongated article which is accommodated and supported within the guide is typically fixed at one end while the other end is movable.

BACKGROUND OF THE INVENTION

There are various types of known protective guides for flexible, elongated articles. The guides are typically made of metal or plastics. Plastic protective guides in which each component is molded of synthetic resin are disclosed in Japanese Patent Publication (Kokoku) No. Hei 2-40135 and Japanese Laid-open (Kokai) Patent Publication No. Hei 10-28310.

The protective cable guide described in Hei 2-40135 is composed of link bodies each having a pair of plastic side plates. Link bodies are connected to one another by the engagement of protrusions formed in one link body with holes formed in side plates of an adjacent link body so that the link bodies are pivotally attached to each other.

On the other hand, the protective guide described in Hei 10-28310 is a belt-type guide comprising a plastic bottom wall, and side walls extending perpendicularly from the bottom wall, each side wall being split by grooves.

In the first of the above two conventional protective cable guides, where the link bodies are connected by pivoting attachment between protrusions and holes, dust is generated as a result of wear occurring at the pivots during articulating movement, and noise due to friction is also generated. Furthermore, since the link bodies pivot freely, the guide can readily collapse from an unstable condition and strike a floor or other surface, generating a large amount of noise.

Furthermore, since the second of the above two conventional protective cable guides is a belt type guide, it is not possible to shorten or lengthen the guide.

Accordingly, a general object of the invention is to solve one or more of the above-mentioned problems encountered in prior art protective guides. More specifically, an object of the invention is to provide a protective guide that avoids the production of dust due to friction occurring in articulation of the guide. Another object is to prevent the generation of noise during high speed movement. Still another object is to provide a guide that can be easily lengthened or shortened by the removal or addition of guide components.

SUMMARY OF THE INVENTION

The protective guide in accordance with the invention comprises a plurality of links connected to one another, each link being formed by a pair of spaced and opposed side plates, a first connecting plate extending from an upper edge of one side plate to an upper edge of the other side plate and a second connecting plate extending from a lower edge of said one side plate to a lower edge of said other side plate. Each of the side plates is a unitary element including a connecting rod protruding from a first side edge thereof. The connecting rod includes a flexible portion. Each side plate also has a connecting recess formed in a second side edge opposite to the first side edge, into which a connecting rod of a side plate of an adjacent link extends, whereby adjacent links of the guide are articulably connected to one another.

Preferably, an enlarged engagement portion is formed at an end of each connecting rod, and the enlarged engagement portion fits into, and is secured to, an engagement opening of a side plate of an adjacent link.

In a preferred embodiment, the second side edge of each side plate comprises an inclined surface on one side of the connecting recess. This inclined surface is positioned for engagement by a portion of the first side edge of an adjacent side plate, and limits the articulation of adjacent links to a predetermined angle. The portion of the connecting recess, into which a connecting rod extends, preferably widens gradually in a direction toward the side plate having the connecting rod which it receives.

In a preferred embodiment each side plate includes a side wall cover on its outer surface, and adjacent connecting plates of adjacent links overlap each other.

When a movable end of the protective guide is reciprocated while a cable or other flexible, elongated element is disposed inside the guide, the guide can be bent, by virtue of the bending of flexible portions of the connecting rods, until portions of edges of the side plates of the links abut inclined surfaces of the side plates of adjacent links. Since the side plates and connecting rods of the links have no portions which rub against each other frictionally as the guide bends, no dust is generated. Furthermore, since the adjacent links are connected to each other by connecting rods having flexible portions integrally formed on the side plates, the upper edge portions of the side plates can smoothly abut against a floor surface, reducing the generation of noise. Additionally, links can be added or removed easily.

BRIEF DESCRIPTION OF THE DRAWINGS

FIGS. 2(A), 2(B), and 2(C) are exploded views illustrating the relationship between components of a link of the protective guide of FIG. 1;

DETAILED DESCRIPTION OF THE PREFERRED EMBODIMENTS

Figure 1:
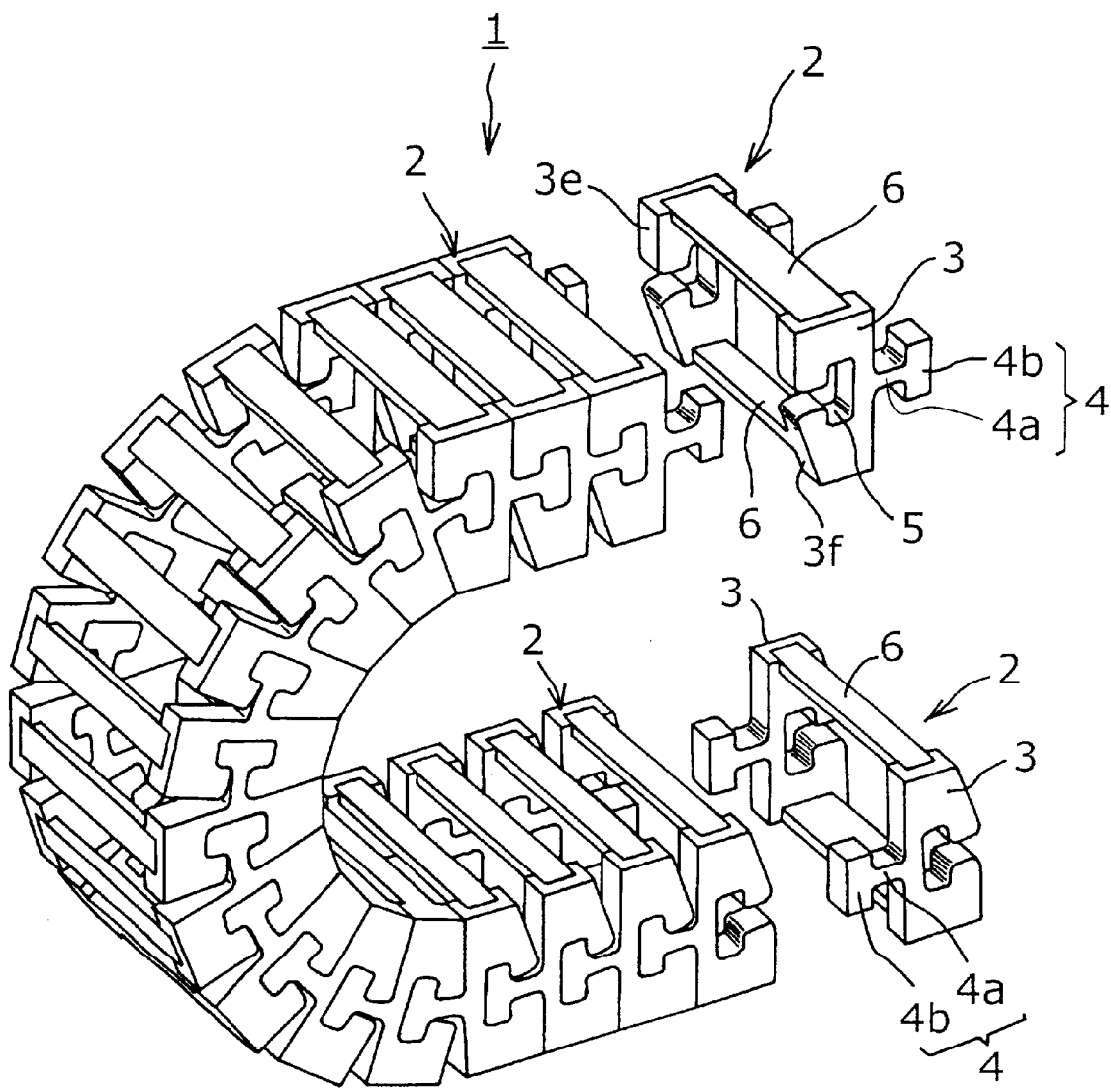
FIG. 1 is a perspective view of a protective guide according to a first embodiment of the invention.

In the first embodiment of the invention, illustrated in FIGS. 1 to 4, the protective guide 1 comprises a plurality of links 2 connected to one another to form an elongated guide having an internal-channel extending in the longitudinal direction of the guide for accommodating a cable (not shown).

Each link 2 is formed by connecting a pair of spaced and opposed synthetic resin side plates 3 with connecting plate 6 laid across the upper and lower parts of the link, and engaged respectively with upper edges and lower edges of the side plates 3. As shown in FIGS. 2(A)–2(C), a groove 3a is formed on the upper edge of each side plate 3, and a protrusion 3b is formed in the groove 3a. Similar grooves with protrusions are formed on the lower edges of the side plates. The connection between the side plate 3 and the connecting plate 6 is performed by press-fitting the protrusions 3a into holes 6a in the connecting arms.

FIG. 2(A) shows how the four components of a link, that is, the two side plates and the two connecting plates, are arranged for assembly. The connecting plates 6 are mounted onto the side plates 3 respectively from above and below. In FIG. 2(B), the side plates and the lower connecting plate are pre-assembled, and an upper connecting plate 6 attached to the upper edges of the side plates. In FIG. 2(C), a side plate 3 and upper and lower connecting plates 6 are pre-assembled and another side plate is attached to the pre-assembled structure to complete the assembly of the link. The links of FIGS. 2(A) and 2(B) can be assembled without deforming the side plates and connecting arms, whereas some deformation of the connecting plates takes place when the link is assembled in the manner depicted in FIG. 2(C). FIGS. 2(B) and 2(C) also illustrate how a connecting plate, or a side plate, can be replaced, and also how the guide can be opened, by removal of a connecting plate or a side plate, in order to remove or insert the cable or other elongated article to be enclosed and protected by the guide.

Figure 3:
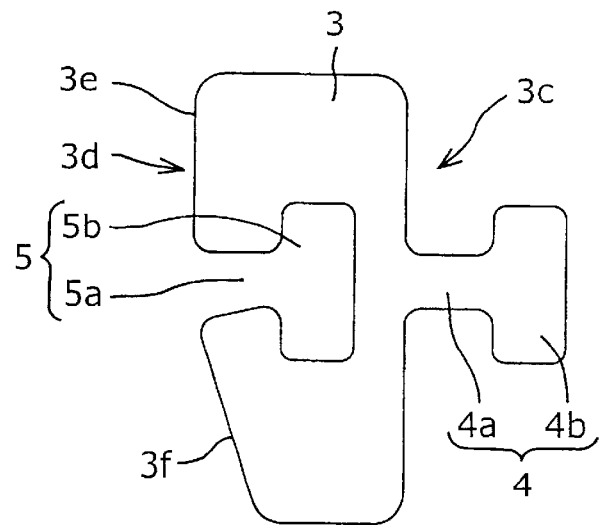
FIG. 3 is a side elevational view of a side plate of a link of the guide shown in FIG. 1.

As shown in FIG. 3, each side plate 3 includes a connecting rod 4 protruding outward from one edge 3c of the side plate 3. The connecting rod and the remainder of the side plate are integrally formed as a unit by molding from synthetic resin. Each side plate also includes a connecting recess 5, disposed inside its opposite edge 3d, and into which a connecting rod 4 may be fitted. In this embodiment, the connecting rod 4 comprises a flexible portion 4a, which is substantially perpendicular to edge 3c, and a substantially rectangular, solid enlargement, which constitutes an engagement portion 4b, extending both upward and downward from the end of the flexible portion 4a remote from edge 3c.

The connecting recess 5 comprises an entry portion 5a for receiving the connecting rod 4 of a side plate of a next link, and a widened engagement opening 5b, into which an engagement portion 4b of the connecting rod 4 is fitted. As seen in FIG. 3, the lower edge of the entry portion 5a of recess 5 is curved and inclined downward so that the entry portion 5a of the connecting recess 5 widens gradually in the direction from the engagement opening 5b toward edge 3d. The gradual widening of the entry portion 5a allows the connecting rod 4 of the adjoining link to be bent easily bent at its flexible portion 4a.

The edge 3d of the side plate 3 is composed of a substantially vertical opening-restricting surface 3e at the upper portion, above connecting recess 5, and an inclined surface 3f below the lower portion of the connecting recess 5.

In the guide, adjacent links 2 are connected to one another by engaging the connecting rods 4 on the side plates of each link with the connecting recesses 5 in the side plates 3 of an adjacent link. The engagement portions 4b are press-fit into the engagement openings of the side plates of the adjacent links. Articulation of adjacent links with respect to each other is possible by virtue of the flexibility and resilience of the portions 4a of the connecting rods 4.

The protective guide 1 accommodates a cable or other flexible, elongated article. A movable end of the guide can be repeatedly moved in a reciprocating motion. However, during the articulation of the guide, adjacent links are able to bend through a predetermined angle until the lower portions of edges 3c of the side plates of one link abut the inclined surfaces 3f of the side plates of the next link. In this case, the flexible portions 4a of the connecting rods 4 are bent. Therefore, if the inclined surface 3f of the side plate 3 is disposed at an angle of 18E relative to the vertical opening-restricting surface 3e, as shown in FIG. 4, the flexible portion 4a of the connecting rod 4 can be bent through a maximum deformation of 18E.

In the protective guide 1, since the connecting rods of the side plates are fitted to the connecting recesses of the side plates in adjacent links, the adjacent links are articulable by virtue of the flexibility and resilience of the portions 4a of the connecting rods. As a result there is no frictional rubbing of one part against another as bending takes place, and the production of dust due to friction is prevented.

Figure 4:
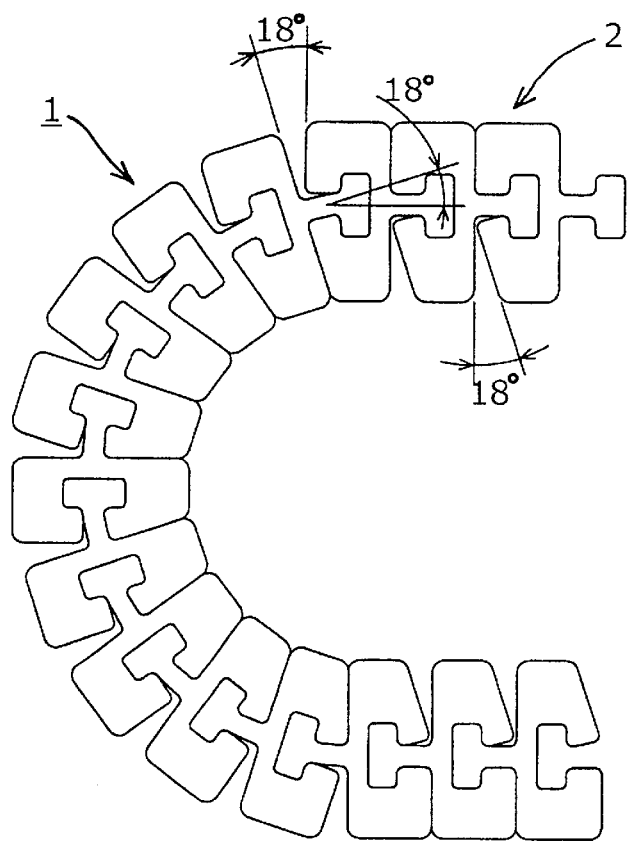
FIG. 4 is a side elevational view showing a bent portion of the protective guide of FIG. 1.

Furthermore, since the flexible portions of the connecting rods are unitary with the remaining portions of the side plates and, by their resilience, tend to return to their relaxed condition, as shown in FIG. 3, even if the movable end of the guide 1 is moved at high speed, the upper edge portions of the side plates come into abutting relationship with a floor surface smoothly, in sequence, as is apparent from FIG. 4. Consequently, the loud noise produced in the operation of conventional guides is avoided.

The connection between the connecting rods and the connecting recesses of the link plates simplifies the engagement and disengagement of links, and consequently links can be added and removed easily.

Figure 5:
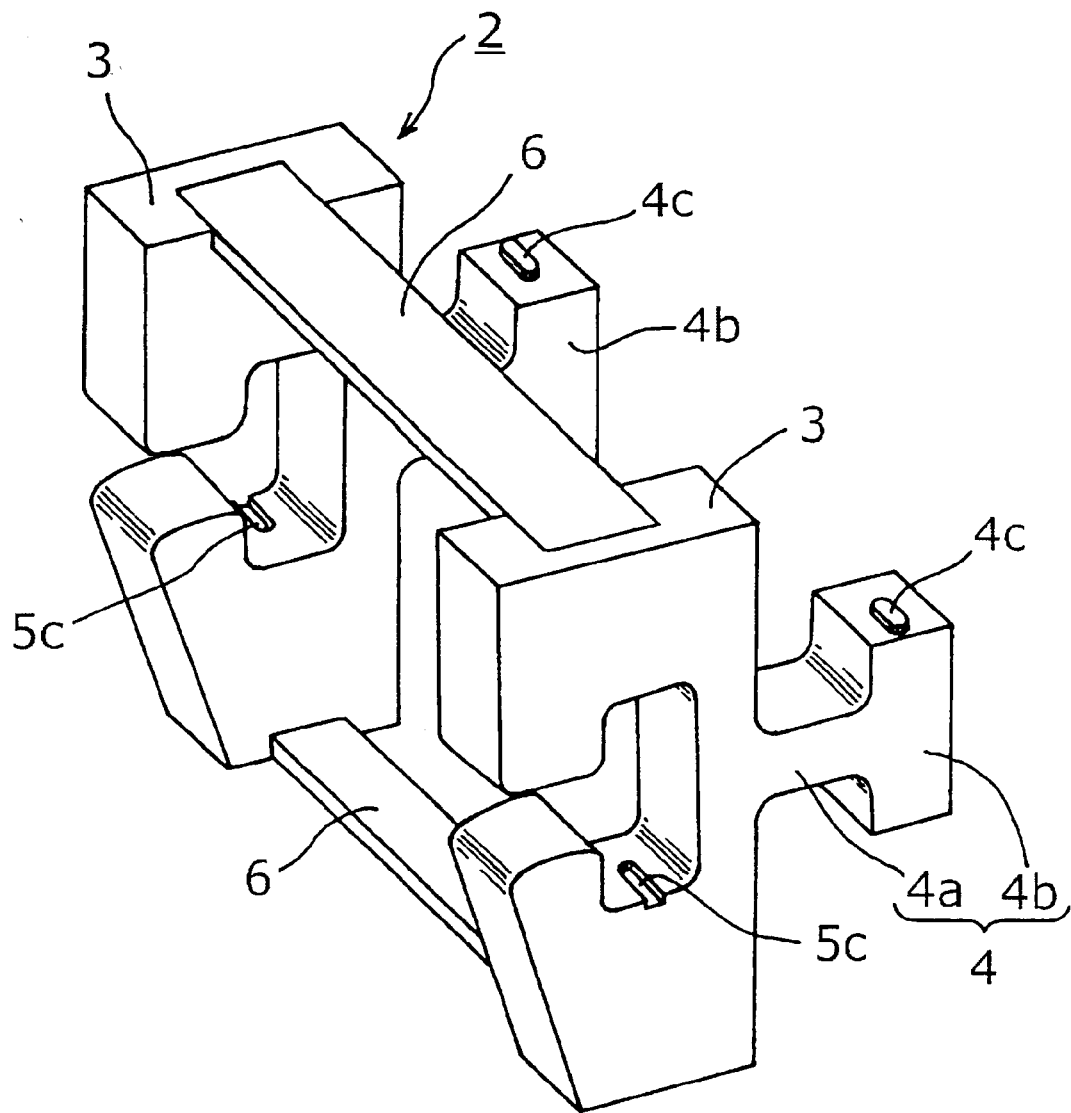
FIG. 5 is a perspective view of a link of a protective guide in accordance with the invention, having modified side plates.

In the modification shown in FIG. 5, protrusions 4c are formed on the upper and lower surfaces of the engagement portions 4b of the connecting rods 4, and grooves 5c are formed in the connecting recesses 5. When a side plate of one link is connected to the side plate of a next link, by inserting the engagement portion 4b into the engagement opening 5b, the protrusions 4c of the engagement portion 4b are press fit into the grooves 5c in the opening 5b. Thus, in this case, the protrusions and grooves are press fit to each other, and the engagement portions 4b need not be press fit as a whole into the openings 5b.

Figure 6:
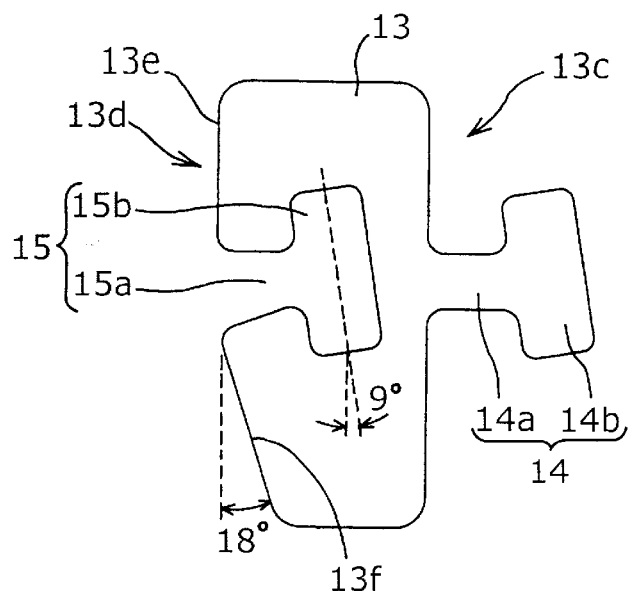
FIG. 6 is a side elevational view of the side plate of a link in accordance with a second embodiment of the invention.
Figure 7:
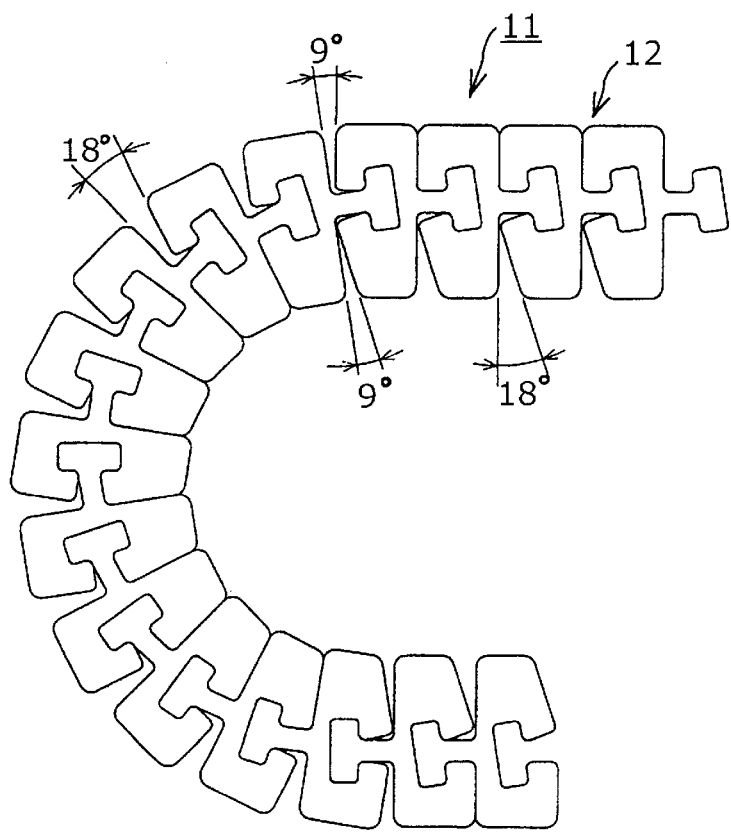
FIG. 7 is a perspective view showing a bent portion of a protective guide of the second embodiment, composed of links as shown in FIG. 6.

In the second embodiment, which is depicted in FIGS. 6 and 7, as in the first embodiment, each link 12 of a guide 11 is formed by connecting a pair of spaced and opposed side plates 13 with connecting plates extending between upper edges of the side plates 13 and between lower edges of the side plates.

As shown in FIG. 6, the side plate 13 includes a connecting rod 14, formed as a unit with the remainder of the side plate, and protruding outward from an edge 13c. A connecting recess 15, into which a connecting rod 14 of an adjacent link can be fitted, is provided in the plate, with its opening between upper and lower parts 13e and 13f of the opposite edge 13d of the plate. The flexible portion 14a of the connecting rod 14 is substantially perpendicular to edge 13c, and has a substantially rectangular solid engagement portion 14b at its end remote from edge 13c.

The connecting recess 15 comprises an entry portion 15a into which a flexible portion 14a of the connecting rod 14 of an adjacent link is inserted. The connecting recess 15 terminates in an engagement opening 15b into which the engagement portion 14b of the connecting rod 14 of an adjacent link is fitted. The entry portion 15a gradually widens in the direction from the opening 15b toward the edge 13d so that the flexible portion 14a located therein can be bent. The corners of the connecting recess 15 are curved to maintain the bending stress of the connecting rod 14 substantially constant. The corners are preferably formed with a fixed radius of curvature.

Likewise, the connecting rod 14 is formed with curved corners to avoid the increased bending stress and reduced service life that would result if the rod were configured so that it bent only at its ends. Furthermore, the engagement opening 15b is generally in the form of a rectangle at an angle (about 9E) which is one-half the angle of inclination (about 18E) of an inclined lower portion 13f of edge 13d relative to the vertical upper portion 13e. As in the first embodiment. The upper portion 13e serves as an opening-restricting surface.

In the guide, adjacent links 12 are connected to one another by engaging the connecting rods 14 on the side plates of each link with the connecting recesses 15 in the side plates 3 of an adjacent link. The engagement portions 14b are press-fit into the inclined engagement openings 15b of the side plates of the adjacent links. Articulation of adjacent links with respect to each other is possible by virtue of the flexibility and resilience of the portions 14a of the connecting rods 14.

Therefore, when a portion of the protective guide 11 is extended horizontally, as in the case of the upper part of the guide shown in FIG. 7, the flexible portion 14a is bent upward (for example by about 9E), and in a case where the protective guide 11 is bent to the maximum permissible extent, as at the left portion of FIG. 7, the flexible portion 14a is bent downward (for example through an angle of about 9E).

When the protective guide 11 of the second embodiment is bent, the deformation angle of the flexible portion 14a of the connecting rod 14 reaches a maximum which is about half (about 9E) the deformation angle of the first embodiment. Accordingly, the side plates 13 may be made of a synthetic resin having a relatively high-rigidity, and, as a result, a prolonged service life of the protective guide 11 can be realized.

Figure 8:
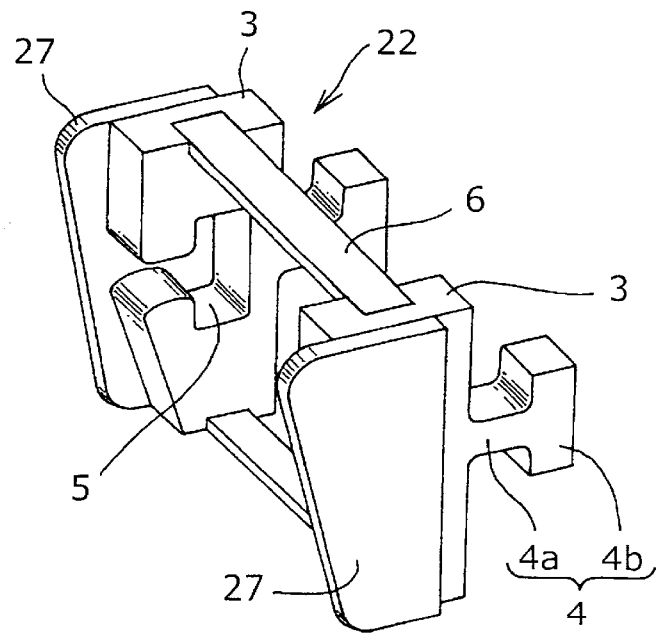
FIG. 8 is a perspective view of a link in accordance with a third embodiment of the invention.
Figure 9:
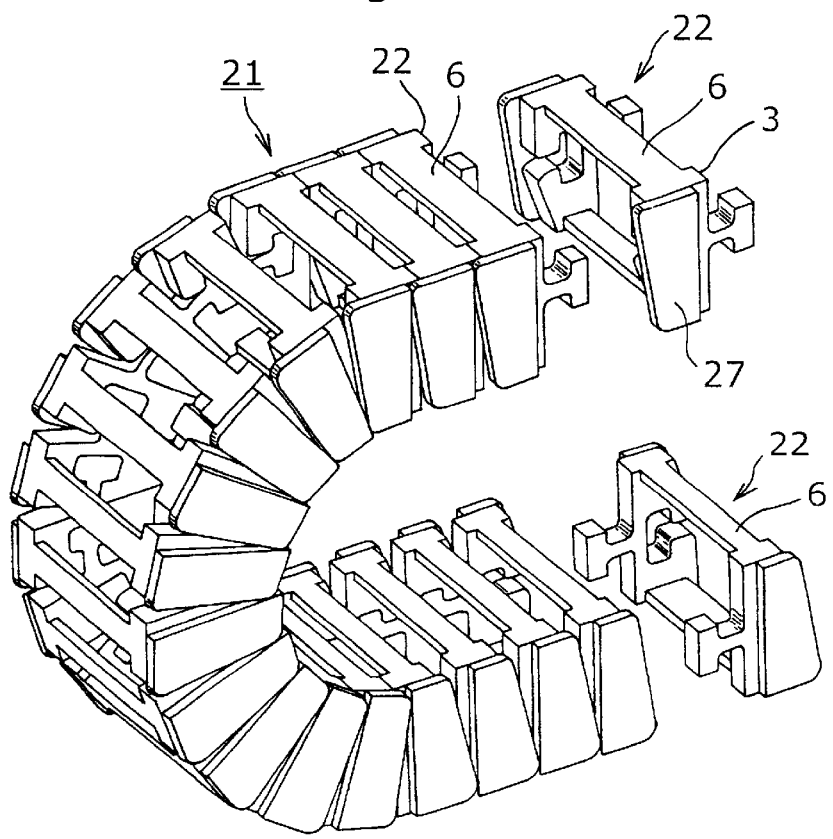
FIG. 9 is a perspective view showing a bent portion of a protective guide of the third embodiment, composed of links as shown in FIG. 8.

In the third embodiment of the invention, shown in FIGS. 8 and 9, the protective guide 21 corresponds to the protective guide of the first embodiment, except that the side plates 3 are provided with side wall covers. Components corresponding to components in FIGS. 1–5 are designated by the same reference numbers. Each link 22 is formed by connecting a pair of spaced and opposed side plates 3 with connecting plates 6 respectively extending between upper edges and between lower edges of the side plates 3.

Each side wall cover 27 is composed of a synthetic resin, and is preferably molded as a unit with a side plate 3, although it can be attached to the side plate by various means such as an adhesive or screw fasteners. As in the first embodiment, a connecting rod 4 and the remainder of the side plate are molded as a unit, and the connecting rod protrudes from an edge 3c of the side plate 3. A recess 5 to which a connecting rod is fitted is provided on the opposite edge 3d, which includes an opening-restricting surface 3e and an inclined surface 3f.

The connecting rod 4 is substantially perpendicular to edge 3c and comprises a flexible portion 4a and a substantially rectangular solid, enlarged, engagement portion 4b.

The connecting recess 5 comprises an entry portion for receiving the flexible portion 4a of connecting rod 4 of a side plate of a next link, and an engagement opening 5b, into which an engagement portion 4b of the connecting rod 4 fits. As in the first embodiment, a gradual widening of the entry portion allows the connecting rod 4 of the adjoining link to be bent easily bent at its flexible portion 4a.

In the protective guide 21, the adjacent links 22 are connected to one another by fitting the connecting rods 4 of the side plates 3 into connecting recesses 5 in the side plate 3 of an adjacent link 22. As in the previously described embodiments, the protective guide 21 is articulable by virtue of the flexibility of portions 4a of the connecting rods.

The side covers 27, which are unitary with the side plates 3, limit sideways shifting of the links. As a result, disengagement of the links due to dislodgment of the side plates 3 from one another is prevented. Furthermore, since sideways movement of the links 22 is limited by the side wall covers 27, it is not necessary to press-fit the connecting rods into the engagement openings of the connecting recesses of adjacent links. Thus, assembly of the protective guide 21 becomes easy. Furthermore entry of foreign substances into the space between the side plates of the guide can be prevented by the side wall covers 27.

Figure 10A:
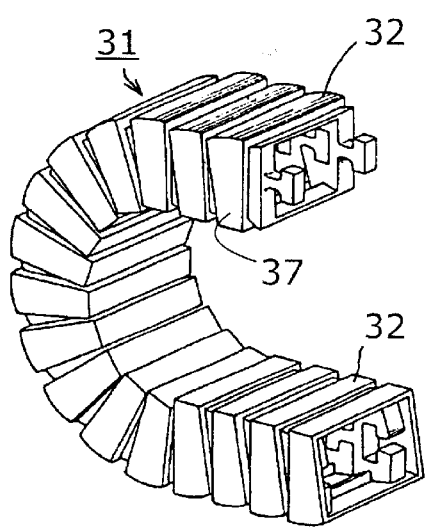
FIG. 10(A) is a perspective view of a bent portion of a protective guide for in accordance with a fourth embodiment of the invention.
Figure 10B:
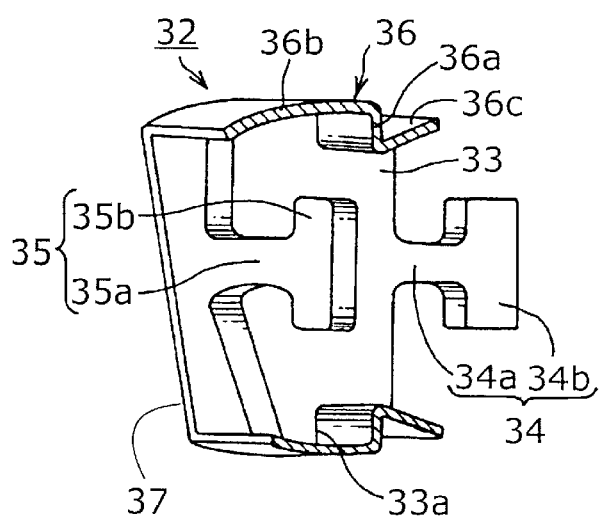
FIG. 10(B) is a partly cut away perspective view of a link of the guide of the fourth embodiment.
Figure 10C:
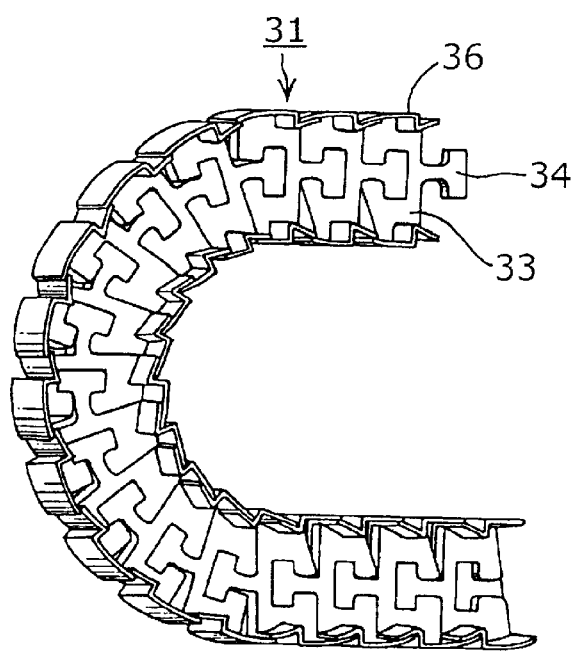
FIG. 10(C) is cut away perspective view of a bent portion of the guide of the fourth embodiment.

In the protective guide 31, according to a fourth embodiment of the invention shown in FIGS. 10(A), 10(B) and 10(C), covers 37 were added to side plates 33, which are substantially the same as the side plates 3 of the first embodiment. Connecting plates 36 are continuous with the covers, and the connecting plates 36 of adjacent links 32 overlap one another.

Each link 12 is formed by connecting a pair of spaced and opposed synthetic resin side plates 33 with plate-like connections 36 respectively laid across upper edges and lower edges of the side plates 33. The connecting plates 36 are composed of plate members 36b and 36c having a step portion 36a. When links 32 are connected to each other by means of their connecting rods, a plate member 36b, and another plate member 36c in the adjacent connection, overlap each other.

The side plates 33 have cut away portions 33a, and the step portions 36a of the connecting plates 36 are accommodated by the cut away portions 33a. The connecting plates 36 may be detachably secured to the side plates 33 by screw fasteners.

The side plates 33 have integrally molded side wall cover 37 on their outer sides. The side plates of successive links are connected to one another by fitting connecting rods 34 into connecting recesses 35, as in the first embodiment.

In the protective guide 31, as shown in FIG. 10(C), connecting plates 36 of the adjacent links 32 overlap one another. The step portions 36a connecting parts 36b and 36c can serve as articulation-limiting boundaries. The sides of the protective guide 31 are also closed by the side wall covers 37. Accordingly, the space inside the protective guide 31 can be fully enclosed. Therefore, the entry of foreign substances, such as machine tooling chips, into the space between the side plates can be prevented. Cleanliness of the environment of the guide can also be improved by prevention of the discharge to the outside of powder resulting from wear.

Figure 11A:
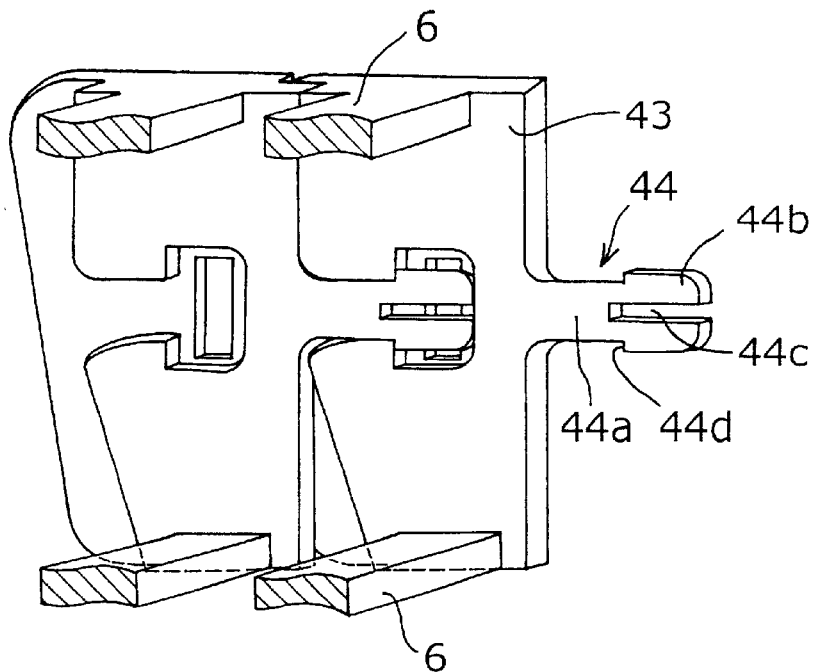
FIG. 11(A) is a cut-away perspective view of a connected pair of links of a fifth embodiment of the invention.
Figure 11B:
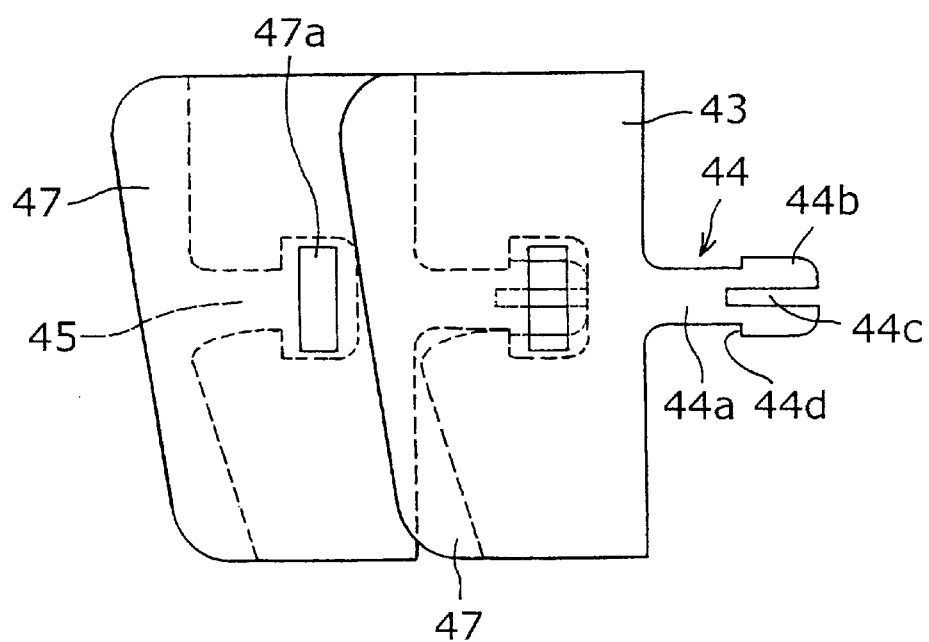
FIG. 11(B) is a side elevational view illustrating the connection of the side plates of the fifth embodiment.

As shown in FIGS. 11(A) and 11(B), a connecting rod 44, extending from a side plate 43, may have a flexible portion 44a, and an engagement portion 44b, the engagement portion having a groove 44c and hook surfaces 44d. Connection between successive side plates 43 is established by inserting a connecting rod 44 of one side plate 43 into a connecting recess of the adjacent side plate 43 in the longitudinal direction of the guide. If the side plate 43 has a side wall cover 47, the side plate cannot shift laterally. Furthermore, if a cut-away hole 47a is formed in the side wall cover 47, a link can be disconnected for removal from the guide by deformation of the engagement portion 44b from the outside.

Although, in the embodiments described above, the engagement portions formed on the front ends of the connecting rods are rectangular, the engagement portions can have other shapes such as oval or circular. Furthermore, reinforcing wire may be buried in the flexible portion of the connecting rod of a side plate in the molding process. Furthermore, even though the flexible portion of the connecting rod is formed as a unit with the remainder of the side plate of which it is a part, when the side plate is made of a synthetic resin having high rigidity, in order to increase the rigidity of the protective guide, the side plate may be composed of a flexible synthetic resin. In this case, the different resin for the flexible portion may be injected through another gate into a mold in order to be molded as a unit with the remaining portion of the side plate. In this way, the different synthetic resins may be mixed at their boundaries and thereby connected to each other strongly. Furthermore, although the links described above are composed of synthetic resins, similar links can be made of metal.

Figure 12:
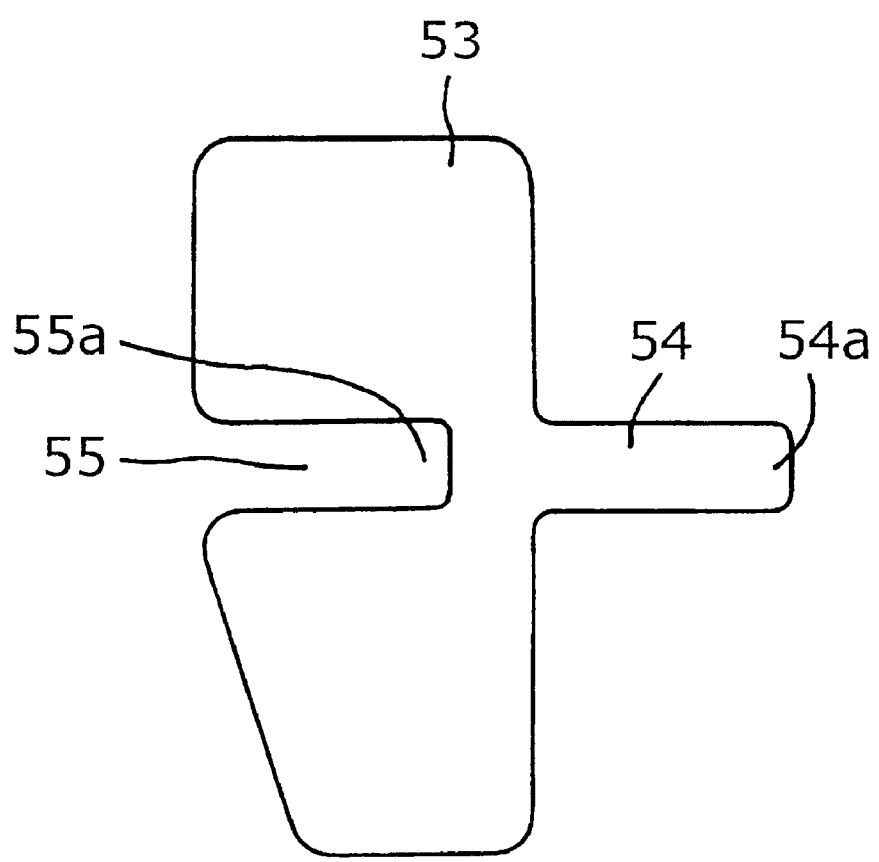
FIG. 12 is a side elevational view showing a modified side plate.

Finally, as shown in FIG. 12, it is not necessary for the end 54a of the connecting rod portion 54 of a side plate 53 to have an enlarged portion. The connecting rod can be connected to an end portion 55a of a connecting recess 55 by an adhesive. Side plates secured together by adhesive can be separated from one another by insertion of a tool.

As described above, each of the side plates of a link includes a connecting rod protruding from a side edge thereof and having an integrally formed flexible portion, and a connecting recess formed in an opposite side edge, into which a connecting rod of an adjacent side plate fits. Two links are articulably connected to each other by fitting the connecting rods of the side plates of one link into the connecting recesses of the side plates of the adjacent link. There is no place where a frictional rubbing occurs during bending of the guide, and consequently the production of dust due to friction can be prevented. Furthermore, since the side plate and connecting rod are integrally formed as a unit, the number of parts is reduced, compared to the case where the connecting rod and side plate are produces as separate elements. The connecting recesses into which the connecting rods fit are formed in the side plates, and initial assembly of the protective guide, and disengagement and addition of the links thereof, can be carried out easily.

In the protective guide according to the invention, since the connecting rods maintain a predetermined angle when in their relaxed condition, when the links move to a stable position on a floor surface, the upper edge portions of the side plates contact the floor surface smoothly, excessive noise is avoided.

Furthermore, since links are connected to one another by engagement of connecting rods of the side plates of a link with connecting recesses of side plates of an adjacent link, detachment and attachment of the links can be carried out easily.

Where an enlarged engagement portion formed at an end of a connecting rod fits into an engagement opening of an adjacent side plate the articulating links are strongly connected to one another.

When an inclined surface, disposed at a predetermined angle, is provided to one side of a connecting recess, and the recess gradually widens, adjacent links can be bent easily relative to each other.

Where side wall covers are provided on both outer sides of the side plates, lateral shifting of the adjacent links can be prevented, and entry of foreign substances can be prevented.

Where the side plates forming a link include side wall covers, and the connecting plates of the adjacent links have overlapping portions, the inside of the protective guide can be fully enclosed. As a result, the release of dust produced by reciprocating movement of the guided cable can be prevented, and the entry of foreign substances from the outside to the interior of the protective guide can also be prevented.

We claim:

1. A protective guide for a flexible, elongated article, comprising:

links connected to one another in sequence along a direction of elongation of the flexible, elongated article, each link being formed by a pair of spaced and opposed side plates, a first connecting plate extending, transverse to said direction of elongation, from an upper edge of one side plate of each link to an upper edge of the other side plate thereof and a second connecting plate extending, transverse to said direction of elongation, from a lower edge of said one side plate of each link to a lower edge of said other side plate thereof;

in which each of said side plates is a unitary element including a connecting rod protruding, along said direction of elongation, from a first edge thereof, said connecting rod including a flexible portion, and a connecting recess formed in a second edge opposite to said first edge, and extending from said second edge into the side plate along said direction of elongation, the connecting rods protruding from the side plates of each link of a plurality of said links along said direction of elongation into connecting recesses of side plates of an adjacent link to connect said adjacent links of said guide articulably to one another;

in which an enlarged engagement portion is formed at an end of each said connecting rod of said plurality of links, and said enlarged engagement portion fits into an engagement opening of a side plate of an adjacent link;

in which one of the first and second edges of each side plate comprises an inclined surface on one side of said connecting recess positioned for engagement by a portion of an adjacent one of the first and second edges of an adjacent side plate, and thereby limiting the articulation of adjacent links to a predetermined angle;

in which the flexible portions of the connecting rods of the side plates of each link of said plurality of links are flexible about axes extending in the direction from one side plate to an opposed side plate thereof;

in which said enlarged engagement portions of the connecting rods of the side plates of each link of said plurality of links are held in said engagement openings against rotation about axes extending in the direction from one side plate to an opposed side plate; and in which the portion of the connecting recess, into which a connecting rod extends, gradually widens in a direction toward the side plate from which the last-mentioned connecting rod extends, thereby allowing bending of the flexible portion of the connecting rod therein.

2. A protective guide according to claim 1, in which each said side plate includes a side wall cover on its outer surface.

3. A protective guide according to claim 2, in which adjacent connecting plates of adjacent links overlap each other.

4. A protective guide according to claim 1, in which the second edge of each side plate comprises an inclined surface on one side of said connecting recess positioned for engagement by a portion of the first edge of an adjacent side plate, and thereby limiting the articulation of adjacent links to a predetermined angle.

* * * * *